(12) United States Patent
Zhang

(10) Patent No.: US 11,326,319 B2
(45) Date of Patent: May 10, 2022

(54) HYDRAULIC TORQUE CONVERTER TRANSMISSION SYSTEM FOR DYNAMIC COMPACTOR AND THE DYNAMIC COMPACTOR

(71) Applicant: Junqiang Zhang, Changsha (CN)

(72) Inventor: Junqiang Zhang, Changsha (CN)

( * ) Notice: Subject to any disclaimer, the term of this patent is extended or adjusted under 35 U.S.C. 154(b) by 485 days.

(21) Appl. No.: 16/494,317

(22) PCT Filed: Mar. 15, 2018

(86) PCT No.: PCT/CN2018/079182
§ 371 (c)(1),
(2) Date: Sep. 16, 2019

(87) PCT Pub. No.: WO2018/166506
PCT Pub. Date: Sep. 20, 2018

(65) Prior Publication Data
US 2020/0011021 A1 Jan. 9, 2020

(30) Foreign Application Priority Data

Mar. 16, 2017 (CN) .......................... 201710154937.8

(51) Int. Cl.
*E02D 3/046* (2006.01)
*B66D 1/14* (2006.01)
*F16H 45/02* (2006.01)

(52) U.S. Cl.
CPC .............. *E02D 3/046* (2013.01); *B66D 1/14* (2013.01); *F16H 45/02* (2013.01)

(58) Field of Classification Search
CPC ............ E02D 3/046; B66D 1/14; F16H 45/02
See application file for complete search history.

(56) References Cited

U.S. PATENT DOCUMENTS

2005/0133774 A1   6/2005   Long

FOREIGN PATENT DOCUMENTS

| CN | 202545733 U | 11/2012 |
| CN | 203270570 U | 11/2013 |
| CN | 103924573 A | 7/2014 |
| CN | 104803312 A | 7/2015 |
| CN | 205469870 U | 8/2016 |
| CN | 205931299 U | 2/2017 |

(Continued)

*Primary Examiner* — Tara Mayo-Pinnock
(74) *Attorney, Agent, or Firm* — Bayramoglu Law Offices LLC

(57) ABSTRACT

A hydraulic torque converter transmission system for a dynamic compactor and the dynamic compactor includes an engine, a hydraulic torque converter, a winch, a transfer case, a gearbox, a transmission case, and a reduction gearbox; the power of the engine is transmitted to the winch by means of the hydraulic torque converter; a part of the power of the engine is transmitted to the hydraulic torque converter through the transfer case, and an other part of the power of the engine is transmitted to a hydraulic pump through the transfer case. An output power is transmitted to the transmission case through the gearbox, and the output power of the transmission case is driven by the reduction gearbox to rotate the winch. An output shaft of the engine is along an X-axis directional arrangement, a winch rotating shaft is arranged along a Y-axis direction.

16 Claims, 2 Drawing Sheets

(56) References Cited

FOREIGN PATENT DOCUMENTS

| | | | | | |
|---|---|---|---|---|---|
| CN | 106836178 | A | * | 6/2017 | ............. E02D 3/046 |
| CN | 106976811 | A | | 7/2017 | |
| GB | 1130307 | A | * | 10/1968 | ............... B66D 1/02 |
| JP | H09151082 | A | | 6/1997 | |
| WO | WO-2018166506 | A1 | * | 9/2018 | ............... B66D 1/02 |

* cited by examiner

HYDRAULIC TORQUE CONVERTER TRANSMISSION SYSTEM FOR DYNAMIC COMPACTOR AND THE DYNAMIC COMPACTOR

CROSS REFERENCE TO THE RELATED APPLICATIONS

This application is the national phase of International Application No. PCT/CN2018/079182, filed on Mar. 15, 2018, which is based upon and claims priority to Chinese Patent Application No: 201710154937.8, filed on Mar. 16, 2017, the entire contents of which are incorporated herein by reference.

TECHNICAL FIELD

The invention relates to the field of engineering machinery, in particular to a hydraulic torque converter transmission system for dynamic compactor and dynamic compactor.

BACKGROUND

The dynamic compactor is a machine that needs to compact the loose soil in the construction project. The working principle is to repeatedly raise the tamper to a certain height, then put down the tamper, and the freely falling tamper compacts the loose soil. At present, there are three kinds of transmission devices for the dynamic compactor, one is pure machinery transmission, one is pure hydraulic transmission, and the other one is integrated liquid-liquid transmission. Machinery dynamic compactor: its winch, driving system, and slewing mechanism of the machine are mechanical. Disadvantages: large size, inconvenient disassembly and assembly, poor safety which is forbidden to enter by many construction sites. Advantages: good reliability. Hydraulic type dynamic compactor: its winch, driving system and slewing mechanism are all hydraulic control. Disadvantages: low transmission efficiency, high failure rate, difficult maintenance and high technical skills requirements for maintenance personnel. Advantages: small in size and light in weight. Machine-liquid integrated type: its winch is mechanical, while its driving system, slewing mechanism and luffing mechanism are hydraulic control. Advantages: winch is mechanical, which is high efficiency, low failure rate, the other operations (driving, slewing) are hydraulic control, which are small in size and light in weight.

At present, the arrangement of the transmission is very unreasonable, the transmission efficiency is low, the hydraulic transmission and the mechanical transmission interfere with each other, and the dynamic compactor is ultra-wide, ultra-long and overweight, which cannot meet the requirements of high strength and strong construction and reliability, and cannot meet the different assembly requirements for different assembly platform, and cannot meet the arrangement requirements for different type of engine and hosting, and it's difficult for assembly. Patent No. CN201410168149.0 discloses a machine-liquid integrated dynamic compactor. The power transmission route of the scheme is: engine-hydraulic coupler-transfer box-hydraulic pump and winch. The disadvantages are:

1. It is known to those technicians of this field that the transmission ratio of fluid coupling which is also called a hydraulic coupling 1, and the torque change cannot be realized, so the torque and speed remain unchanged. The hydraulic coupling cannot realize the stepless torque change and the stepless speed change function, so the power transmission of the engine can only adopt the mechanical step change of the winch. In the initial stage of lifting the tamper, the dynamic compactor requires high torque and low speed. During the ascending process, the winch hammer needs to increase the rising speed. Therefore, the mechanical gradual shifting cannot meet the construction requirements.

2. The engine and the winch are arranged in parallel in the horizontal direction. The operating platform is ultra-wide and oversize. The arrangement of the operating platform equipment is not compact and cannot be applied to different operating platforms. Such arrangement will result in poor reliability and stability of the operating platform.

3. The engine is located in the middle of the operating platform, so installation and maintenance is very inconvenient.

4. The power of the engine is transmitted to the hydraulic pump, which needs to pass through the hydraulic torque converter, resulting in a decrease in transmission efficiency.

5. When the hydraulic pump and the winch work simultaneously, the power of the engine passes through the hydraulic torque converter, part of which is transmitted to the hydraulic pump, and the other part is transmitted to the winch. Since the engine is intermittently driven by the dynamic compactor during the operation, the engine needs to be powered when the winch is rotating forward. When the winch is reversed, the engine is not required to be powered, and the winch is driven by the tamper free fall drive, this will cause the torque transmitted by the engine to the hydraulic pump to be high and low, which is very unstable, which causes the pressure of the hydraulic system of the dynamic compactor to fluctuate greatly. Therefore, the solution will cause the hydraulic pump and the winch work to interfere with each other, causing the pressure fluctuation of the hydraulic system of the powerful boring machine to be large, and the hydraulic system of the powerful boring machine will be damaged.

SUMMARY

In view of this, the present invention proposes a hydraulic torque converter transmission system for dynamic compactor and dynamic compactor.

In one aspect, the present invention provides a hydraulic torque converter transmission system for dynamic compactor, including an engine, a hydraulic torque converter, and a winch, the power of the engine is transmitted to the winch by means of the hydraulic torque converter.

Further, the pump and the radiator are included, the engine drives the pump to rotate, and the oil inlet of the hydraulic torque converter is connected to the oil outlet of the pump through the oil inlet passages B, and the oil outlet of the hydraulic torque converter is connected to The oil inlet of the radiator through the oil return passage A, and the oil outlet of the radiator is connected to the oil inlet of the pump. A forced cooling system is formed between the transfer pump and the radiator and the hydraulic torque converter.

Further, the transfer case, the gearbox, the transmission case, and the reduction gearbox are included; part of the power of the engine is transmitted to the hydraulic torque converter through the transfer case, and the other part is transmitted to the hydraulic pump through the transfer case. The output power is transmitted to the transmission case through the gearbox, and the output power of the transmission case is driven to rotate by the reduction gearbox; the output shaft of the engine is arranged along the X-axis direction, and the winch rotation axis is arranged along the Y-axis direction, the engine, the transfer case, The hydraulic torque converter, the gearbox and the transmission case are arranged on the left or right side of the winch and reduction gearbox along the X-axis direction; the input shaft of the transmission case is arranged along the X-axis direction, and the output shaft of the transmission case is arranged along the Y-axis direction Engine, transfer case, hydraulic torque converter, gearbox, gearbox, gearbox, and winch are independent units.

Further, the first transmission shaft and the second transmission shaft are arranged, the first transmission shaft is arranged in the X-axis direction, the hydraulic torque converter is connected to the transmission through the first transmission shaft, and the second transmission shaft is arranged in the Y-axis direction, and the transmission case passes through The second transmission shaft is coupled to the reduction gearbox.

Further, the transfer case comprises a transfer case input shaft, a transfer case intermediate shaft, a transfer case output shaft. The transfer case input shaft mounted with a transfer case main gear, and the transfer case intermediate shaft mounted with a transfer. The intermediate gear of the box is equipped with a driven gear driven gear on the output shaft of the transfer case; the main gear of the transfer case meshes with the intermediate gear of the transfer case, and the intermediate gear of the transfer case meshes with the driven gear of the transfer case; the hydraulic pump and the minute The output shaft of the moving box is connected; the two ends of the input shaft of the transfer case are respectively connected with the engine and the hydraulic torque converter.

Further, the gearbox includes an input gear, an output gear, a left deceleration intermediate gear set, a right deceleration intermediate gear set, and a gearbox clutch; the left deceleration intermediate gear set and the right deceleration intermediate gear set include two intermediate gears which are located at upper and lower layers of coaxial connection. The two intermediate gears have a difference in the number of teeth; the output torque of the hydraulic torque converter is transmitted to the gearbox input gear shaft, the gearbox output gear shaft is connected to the gearbox; the gearbox clutch is located at the gearbox input gear and between the gearbox output gears, the gearbox input gear shaft is disengaged or engaged with the gearbox output gear shaft; the gearbox input gear is constantly meshed with the upper intermediate gear of the left deceleration intermediate gear set and the right retarding intermediate gear set, and the gearbox output gear The lower intermediate gear of the left deceleration intermediate gear set and the right deceleration intermediate gear set are constantly meshed.

Further, the transmission case includes two X-axis bevel gears symmetrically arranged along the X-axis direction and two Y-axis bevel gears symmetrically arranged along the Y-axis direction, each of the X-axis bevel gears and the symmetric two Y-axis bevel gears are constantly meshed. each Y-axis bevel gear is constantly meshed with the symmetrical two X-axis bevel gears, respectively.

Further, a reduction gearbox assembly is installed in the reduction gearbox, and the reduction gearbox assembly includes a reduction gearbox input gear, a reduction gearbox output gear, a reduction gearbox intermediate gear, and the reduction gearbox output gear is coaxially connected with the reduction gearbox intermediate gear, and the power transmission of the transmission case The gear is input to the reduction gearbox, and the input gear of the reduction gearbox is constantly meshed with the intermediate gear of the reduction gearbox; the output gear of the reduction gearbox is constantly meshed with the winch drive gear.

Further, the winch includes a reel, a rotating shaft, a driving gear, a clutch hydraulic cylinder, a brake hydraulic cylinder, a clutch mechanism, and a brake mechanism; the reel is rotatably mounted on the rotating shaft, and the driving gear is coupled to the rotating shaft, and the clutch is coupled The hydraulic cylinder is mounted on the driving gear, the driving gear is connected with the clutch mechanism, the clutch hydraulic cylinder drives the clutch mechanism to engage and disengage the driving gear and the reel; the brake hydraulic cylinder drives the braking mechanism to brake the reel.

In another aspect, the present invention provides dynamic compactor comprising the above-described hydraulic torque converter transmission system for dynamic compactor, a driving system, an operating platform, the transmission system is arranged on the operating platform, the hydraulic pump supplies pressurized oil to the travel system.

The prior art has a beneficial effect of the hydraulic torque converter transmission system for dynamic compactor and dynamic compactor of the present invention in that:

1. The invention adopts a hydraulic torque converter to drive the winch rotation, and realizes the functions of transmitting torque, stepless torque change, stepless speed change and clutching, and the winch can realize the functions of stepless torque change, stepless speed change and clutch, and improve dynamic compactor. Construction reliability and stability can meet the requirements of high strength and strong construction. In addition, forced cooling of the torque converter improves the reliability and stability of the hydraulic torque converter. In addition, the invention also adopts a mechanical step-variable shifting mode such as a gearbox, a transmission case and a reduction gearbox, and combines with the stepless hydraulic torque converter and the stepless speed change of the hydraulic torque converter to further improve the reliability and stability of the construction, to further meet the high-strength strong construction requirements.

2. Modular design, engine, transfer case, hydraulic torque converter, gearbox, transmission case, reduction gearbox, and winch are independent units, which can be disassembled and replaced separately. The engine, the transfer case, the hydraulic torque converter, the gearbox, and the transmission case are arranged along the X-axis direction, and are located on the left or right side of the reduction gearbox and the winch, and the winch is arranged along the Y-axis direction, and the engine is along the X-axis direction. The transmission arrangement is compact, the installation and maintenance are convenient, the operating platform space is saved, and the operating platform width is reduced.

3. This patent can be applied to different operating platform structures, such as box operating platforms and flat operating platforms. It is also possible to apply different winches and engine arrangements, for example: if the winch is arranged on the left side, the engine, transfer case, hydraulic torque converter, gearbox, gearbox can be arranged on the right. If the winch is arranged on the right side, the engine, the transfer case, the hydraulic torque converter, the gearbox, and the gearbox can be arranged on the left side.

4. The transmission route of this patent is: engine-transfer box-hydraulic torque converter (hydraulic pump)-gearbox-transmission case-reduction gearbox-winding. Part of the power of the engine is transmitted directly to the hydraulic pump through the transfer case, and the other part is directly transmitted to the hydraulic torque converter through the transfer case. Therefore, compared with the prior art, the power of the hydraulic pump does not pass through the hydraulic torque converter, which improves the transmission efficiency. When the hydraulic pump and the winch work at the same time, the engine intermittently drives the winch and rotating, generating torque fluctuations, which are absorbed by the hydraulic torque converter. The hydraulic transmission and the mechanical transmission do not interfere with each other. The pressure fluctuation of the hydraulic system of the dynamic compactor is small, and the working reliability and stability of the dynamic compactor are high.

5. The gearbox is provided with flanges in all four orientations. Therefore, the engine, the transfer case, the hydraulic torque converter, the gearbox and the gearbox can be arranged on the left side of the operating platform or on the right side of the operating platform. Can adapt to different operating platform layouts.

BRIEF DESCRIPTION OF THE DRAWINGS

The accompanying drawings, which are incorporated in the claims

In the drawing.

DETAILED DESCRIPTION OF THE EMBODIMENTS

It should be noted that the embodiments in the present invention and the features in the embodiments may be combined with each other without conflict. The invention will be described in detail below with reference to the drawings in conjunction with the embodiments.

Figure 1:
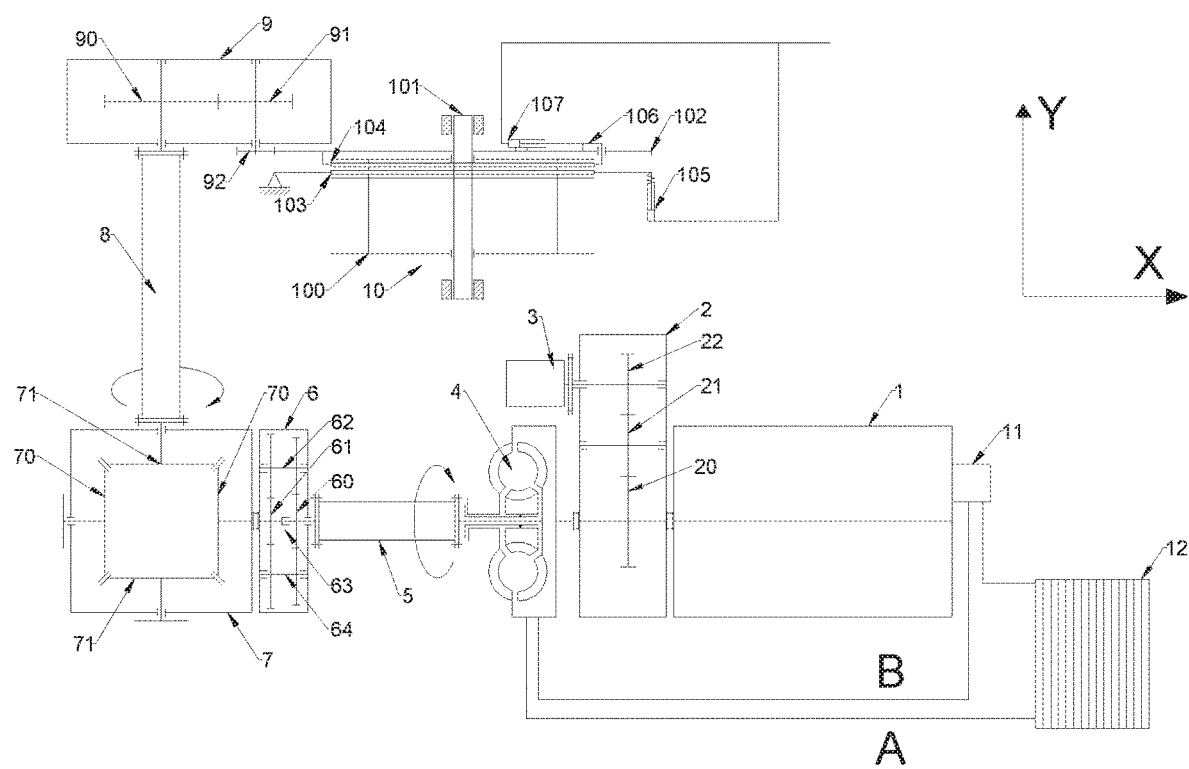
FIG. 1 shows a schematic view of a transmission system of a first embodiment of the present invention.

As shown in FIG. 1, the present invention provides a hydraulic torque converter transmission system for dynamic compactor, including an engine 1, a hydraulic torque converter 4, and a winch 10, the power of the engine 1 is transmitted to the winch 10 by means of the hydraulic torque converter 4.

It is known to those technicians in the field that the hydraulic torque converter 4 is a non-rigid hydraulic torque converter with a liquid as the working medium and is one of the forms of hydraulic transmission. The hydraulic torque converter 4 has a closed working chamber in which the liquid circulates, wherein the pump wheel, the turbine and the guide wheel are connected to the input shaft, the output shaft and the housing, respectively. When the engine 1 drives the input shaft to rotate, the liquid flows out from the centrifugal pump wheel, passes through the turbine, the guide wheel, and then returns to the pump wheel, and circulates again and again. The pump wheel transfers the mechanical energy of the input shaft to the liquid. The high velocity liquid pushes the turbine to rotate and deliver energy to the output shaft. The hydraulic torque converter 4 transmits torque by the interaction of the liquid and the blades to produce a change in momentum moment. The main feature of the hydraulic torque converter 4 that differs from the fluid coupling is that it has a fixed guide wheel. The diversion of the guide wheel to the liquid causes the output torque of the hydraulic torque converter 4 to be higher or lower than the input torque, and is therefore referred to as a hydraulic torque converter. The ratio of the output torque to the input torque is called the torque coefficient, and the zero-speed torque coefficient when the output speed is zero is usually about 2-6. The hydraulic torque converter coefficient decreases as the output speed increases. The input shaft of the hydraulic torque converter 4 is in fluid communication with the output shaft, and there is no rigid connection between the working members. The characteristics of the hydraulic torque converter 4 are: the impact and vibration can be eliminated, the overload protection performance and the starting performance are good; the rotational speed of the output shaft can be greater or less than the rotational speed of the input shaft, and the rotational speed difference of the two shafts varies with the magnitude of the transmitted torque; It has good automatic shifting performance. When the load increases, the output speed will automatically drop, and vice versa. If the engine 1 has a stable working area, the transient change of the load will not be reflected on the engine 1. The hydraulic torque converter 4 is more efficient near rated conditions, with a maximum efficiency of 85% to 92%.

Therefore, the hydraulic torque converter 4 is applied to the transmission system of dynamic compactor, and the winch 10 rotation is driven, which can improve the reliability and stability of the construction, and can meet the requirements of high strength and strong construction.

In addition, the transfer pump 11 and the radiator 12 are further included. The engine 1 drives the transfer pump 11 to rotate, and the oil inlet of the hydraulic torque converter 4 is connected to the oil outlet of the transfer pump 11 through the oil inlet passages B, and the oil outlet of the hydraulic torque converter 4 is connected to The oil inlet of the radiator 12 through the oil return passage A, and the oil outlet of the radiator 12 is connected to the oil inlet of the transfer pump 11. A forced cooling system is formed between the transfer pump 11 and the radiator 12 and the hydraulic torque converter 4.

Figure 2:
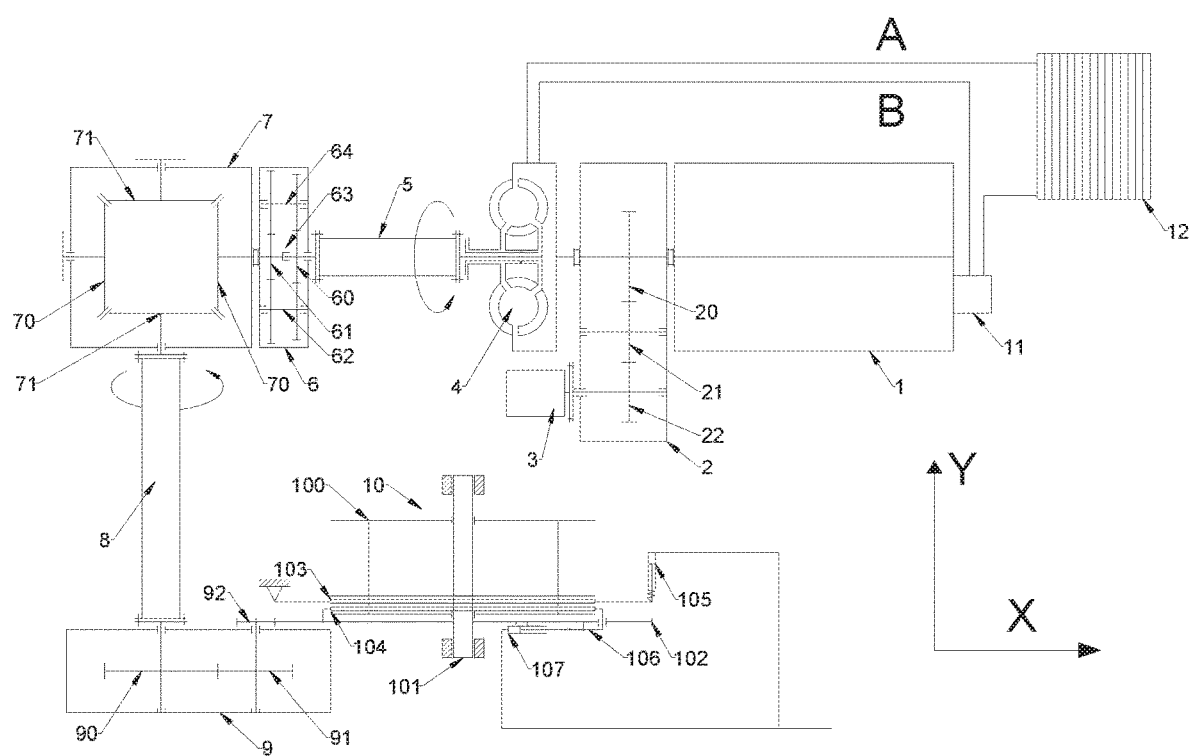
FIG. 2 shows a schematic view of a transmission system of a second embodiment of the present invention.

In a further technical solution, the transfer case 2, the first transmission shaft 5, the gearbox 6, the transmission case 7, the second transmission shaft 8, and the reduction gearbox 9; the engine 1, the transfer case 2, and the hydraulic torque converter are further included. The first transmission shaft 5, the gearbox 6, and the transmission case 7 are arranged on the right side of the winch 10 and the reduction gearbox 9 in the X-axis direction. As shown in FIG. 2, the engine 1, the transfer case 2, the hydraulic torque converter 4, the first transmission shaft 5, the gearbox 6, and the transmission case 7 are arranged on the left side of the winch 10 and the reduction gearbox 9 in the X-axis direction.

The second transmission shaft 8 is arranged along the Y-axis direction, the output shaft of the engine 1 is arranged along the X-axis direction, the rotary shaft 101 of the winch 10 is arranged along the Y-axis direction, and the input shaft of the transmission case 7 is arranged along the X-axis direction, and the output of the transmission case 7 is arranged. The shaft is arranged along the Y-axis direction; the engine 1, the transfer case 2, the hydraulic torque converter 4, the first transmission shaft 5, the gearbox 6, the transmission case 7, the second transmission shaft 8, the reduction gearbox 9, and the winch 10 are Independent units, each unit can be removed and replaced separately.

Part of the power of the engine 1 is transmitted to the hydraulic torque converter 4 through the transfer case 2, and the other part is transmitted to the hydraulic pump 3 through the transfer case 2; the output power of the hydraulic torque converter 4 passes through the first transmission shaft 5, the gearbox 6 is transmitted to the transmission case 7, and the output power of the transmission case 7 is driven to rotate by the second transmission shaft 8 and the reduction gearbox 9 to drive the winch 10. Winding 10 power transmission route: engine 1-transfer case 2-hydraulic torque converter 4-first transmission shaft 5-gearbox 6-transmission case 7-reduction gearbox 9-winch 10. The hydraulic pump 3 transmits the route: the engine 1-the transfer case 2-the hydraulic pump 3. The two power transmission routes are independent of each other and do not interfere with each other. The transmission path arrangement has an advantage over the prior art in that the power of the hydraulic pump 3 does not pass through the hydraulic torque converter 4, which improves the transmission efficiency. When the hydraulic pump 3 and the winch 10 are simultaneously operated, the engine 1 intermittently drives the winch 10 to rotate, generating torque fluctuations, which are absorbed by the hydraulic torque converter 4. The hydraulic transmission and the mechanical transmission do not interfere with each other. The pressure fluctuation of the hydraulic system of the dynamic compactor is small, and the working reliability and stability of the dynamic compactor are high.

The invention separates the functional modules to form a separate unit, and adopts the modular design, so that the transmission device is compactly arranged, the installation and maintenance are convenient, the operation platform space is saved, and the operating platform width is reduced. In addition, each individual unit is located on both sides of the operating platform for easy replacement and maintenance.

As shown in FIG. 1: the transfer case 2 includes a transfer case input shaft, a transfer case intermediate shaft, and a transfer case output shaft. The transfer case input shaft is mounted with a transfer case main gear 20, and a transfer case intermediate shaft A transfer case intermediate gear 21 is mounted thereon, and a transfer case driven gear 22 is mounted on the transfer case output shaft; the transfer case main gear 20 meshes with the transfer case intermediate gear 21, and the transfer case intermediate gear 21 and the transfer case The driven gear 22 is meshed; the hydraulic pump 3 is coupled to the transfer case output shaft; and the transfer case input shaft is coupled to the engine 1 and the hydraulic torque converter 4, respectively. A part of the power of the engine 1 is transmitted to the hydraulic pump 3 after being decelerated and twisted by the transfer case, and another part of the power of the engine 1 is directly transmitted to the hydraulic torque converter 4 through the transfer case 2, and the transmission ratio at this time is 1:1. The engine 1 and the transfer case 2 are rigidly connected by a flange, and the transfer case 2 and the hydraulic torque converter 4 are connected by a flexible coupling.

The gearbox 6 includes a gearbox input gear 60, a gearbox output gear 61, a left deceleration intermediate gear set 62, a right deceleration intermediate gear set 64, and a gearbox clutch 63; the left deceleration intermediate gear set 62 and the right deceleration intermediate gear set 64 include the same Two intermediate gears of the upper and lower layers connected by the shaft, the two intermediate gears of the upper and lower layers have a difference in the number of teeth; the hydraulic torque converter 4 is shaft-connected to the gearbox input gear 60 through the first transmission shaft 5, and the gearbox output gear 61 shaft and the transmission case 7 connections, which are connected by a flexible coupling between them. The gearbox clutch 63 is located between the gearbox input gear 60 and the gearbox output gear 61 to separate or engage the gearbox input gear 60 shaft with the gearbox output gear 61; gearbox input gear 60 and the left reduction intermediate gear set 62 and The upper intermediate gear of the right reduction intermediate gear set 64 is constantly meshed, and the gearbox output gear 61 is constantly meshed with the lower intermediate gears of the left reduction intermediate gear set 62 and the right reduction intermediate gear set 64.

When the gearbox clutch 63 is engaged, the gearbox input gear 60 shaft is shaft-connected to the gearbox output gear 61, at which time the transmission ratio is 1:1. When the gearbox clutch 63 is disengaged, the power transmission path is: the gearbox input gear 60-the left deceleration intermediate gear set 62 and the right deceleration intermediate gear set 64-the gearbox output gear 61, to realize the deceleration and torque increase transmission.

The transmission case 7 includes two X-axis bevel gears 70 symmetrically arranged along the X-axis direction and two Y-axis bevel gears 71 symmetrically arranged along the Y-axis direction, each of the X-axis bevel gears 70 and the symmetric two Y-axis bevel gears 71 is always engaged, and each Y-axis bevel gear 71 is constantly meshed with the symmetrical two X-axis bevel gears 70, respectively. A connecting flange is mounted on each of the X-axis bevel gear 70 shaft and the Y-axis bevel gear 71 shaft.

The transmission case 7 is provided with flanges in four directions. Therefore, the engine 1, the transfer case 2, the hydraulic torque converter 4, the gearbox 6, and the transmission case 7 may be disposed on the left side of the operating platform, or may be arranged on the right side of the operating platform, it is possible to adapt to different operating platform arrangements. As shown in FIG. 2, the second transmission shaft 8 is coupled to the right flange of the transmission case 7.

A reduction gearbox assembly is installed in the reduction gearbox 9. The reduction gearbox assembly includes a reduction gearbox input gear 90, a reduction gearbox output gear 92, and a reduction gearbox intermediate gear 91. The reduction gearbox output gear 92 is coaxially connected with the reduction gearbox intermediate gear 91, and the transmission case The power of transmission case 7 is transmitted to the reduction gearbox input gear 90, and the reduction gearbox input gear 90 is constantly meshed with the reduction gearbox intermediate gear 91; the reduction gearbox output gear 92 is constantly meshed with the drive gear 102 of the winch 10.

The winch 10 includes a reel 100, a rotating shaft 101, a driving gear 102, a clutch hydraulic cylinder 107, a brake hydraulic cylinder 105, a clutch mechanism 104, and a brake mechanism 103. The clutch mechanism 104 includes a turning arm 106 through which the clutch hydraulic cylinder 107 passes. The arm 106 drives the clutch mechanism 104 to move. The reel 100 is rotatably mounted on the rotating shaft 101, the driving gear 102 is coupled to the rotating shaft 101, the clutch hydraulic cylinder 107 is mounted on the driving gear 102, the driving gear 102 is coupled to the clutch mechanism 104, and the clutch hydraulic cylinder 107 drives the clutch mechanism. The drive gear 102 is engaged and disengaged from the reel 100; the brake hydraulic cylinder 105 drives the brake mechanism 103 to brake the reel 100. The clutch mechanism 104 and the brake mechanism 103 are prior art.

In another aspect, the present invention provides dynamic compactor comprising the above-described hydraulic torque converter transmission system for dynamic compactor, a driving system, an operating platform, the transmission system is arranged on the operating platform, the hydraulic pump 3 supplies pressurized oil to the travel system.

Techniques not described above are common knowledge to those technicians in the field. The above is only the preferred embodiment of the present invention, and is not intended to limit the present invention. Any modifications, equivalent substitutions, improvements, etc., which are included in the spirit and scope of the present invention, should be included in the present invention. Within the scope of protection.

What is claimed is:

1. A hydraulic torque converter transmission system for a dynamic compactor, comprising: an engine, a hydraulic torque converter, and a winch; a power of the engine is transmitted to the winch by means of the hydraulic torque converter (4); the hydraulic torque converter transmission system further comprises a transfer case, a gearbox, a transmission case, and a reduction gearbox; a part of the power of the engine is transmitted to the hydraulic torque converter-through the transfer case, and an other part of the power of the engine is transmitted to a hydraulic pump through the transfer case; an output power is transmitted to the transmission case through the gearbox, and the output power of the transmission case is driven by the reduction gearbox to rotate the winch; an output shaft of the engine is along an X-axis directional arrangement, a winch rotating shaft is arranged along a Y-axis direction; the engine, the transfer case, the hydraulic torque converter, the gearbox, and the transmission case are arranged on a left or right side of the winch and the reduction gearbox is arranged along the X-axis direction; an input shaft of the transmission case is arranged along the X-axis direction, and an output shaft of the transmission case is arranged along the Y-axis direction; the engine, the transfer case, the hydraulic torque converter, the gearbox, the transmission case, the reduction gearbox, the winch are separate units.

2. The hydraulic torque converter transmission system for dynamic compactor according to claim 1, further comprising a transfer pump and a radiator, the engine driving the transfer pump to rotate, an oil inlet of the hydraulic torque converter is connected to an oil outlet of the transfer pump through an oil inlet passage, and an oil outlet of the hydraulic torque converter is connected to an oil inlet of the radiator through an oil return passage, and the oil outlet of the radiator is connected to the oil inlet of the transfer pump; a forced cooling system is formed between the transfer pump and the radiator and the hydraulic torque converter.

3. The hydraulic torque converter transmission system for dynamic compactor according to claim 1, further comprising a first transmission shaft and a second transmission shaft; the first transmission shaft is arranged in the X-axis direction, the hydraulic torque converter is connected to the gearbox through the first transmission shaft; the second transmission shaft is arranged in the Y-axis direction, and the transmission case passing through the second transmission shaft is connected to the reduction gearbox.

4. The hydraulic torque converter transmission system for dynamic compactor according to claim 1, wherein, the transfer case comprises an input shaft of the transfer case, an intermediate shaft of the transfer case, an output shaft of the transfer case; a main gear of the transfer case is mounted on the input shaft of the transfer case; an intermediate gear of the transfer case is mounted on the intermediate shaft of the transfer case, and a driven gear of the transfer case is mounted on the output shaft of the transfer case; wherein, the main gear meshes with the intermediate gear, and the intermediate gear meshes with the driven gear; the hydraulic pump is connected to the output shaft of the transfer case; the input shaft of the transfer case is connected to the engine and the hydraulic torque converter respectively.

5. The hydraulic torque converter transmission system for dynamic compactor according to claim 1, wherein, the gearbox comprises a gearbox input gear and a gearbox output gear, a left deceleration intermediate gear set, a right deceleration intermediate gear set, and a gearbox clutch; the left deceleration intermediate gear set and the right deceleration intermediate gear set include upper and lower layers of coaxially connected two intermediate gears, wherein, the two intermediate gears in the upper and lower layers have different number of teeth; the output torque of the hydraulic torque converter is transmitted to a shaft of the gearbox input gear, a shaft of the gearbox output gear and the transmission case the gearbox clutch is located between the gearbox input gear and the gearbox output gear to separate or engage the shaft of gearbox input gear and the shaft of the gearbox output gear; the gearbox input gear is constantly meshed with the upper intermediate gear of the left deceleration intermediate gear set and the right deceleration intermediate gear set, the gearbox output gear is constantly meshed with the lower intermediate gear of the left deceleration intermediate gear set and the right deceleration intermediate gear set.

6. The hydraulic torque converter transmission system for dynamic compactor according to claim 1, wherein the transmission case comprises two X-axis bevel gears arranged symmetrically along the X-axis direction, and two Y-axis bevel gears symmetrically arranged along the Y-axis direction, each of the X-axis bevel gears (70) constantly meshing with the two Y-axis bevel gears, each Y-axis bevel gear is constantly meshed with the two X-axis bevel gears respectively.

7. The hydraulic torque converter transmission system for dynamic compactor according to claim 1, wherein, the winch comprises a reel, a rotating shaft, a driving gear, a clutch hydraulic cylinder, a brake hydraulic cylinder, a clutch mechanism, and a brake mechanism; the reel is rotatably mounted on the rotating shaft, the drive gear is connected to the rotating shaft, the clutch hydraulic cylinder is mounted on the driving gear, the driving gear is connected to the clutch mechanism, and the clutch hydraulic cylinder drives the clutch mechanism, the drive gear is engaged and disengaged from the reel; the brake hydraulic cylinder drives the brake mechanism to brake the reel.

8. A dynamic compactor, comprising: the hydraulic torque converter transmission system for dynamic compactor according to claim 1, a driving system, an operating platform; wherein, the hydraulic torque converter transmission system is arranged on the operating platform, and the hydraulic pump supplies pressurized oil to the driving system.

9. The dynamic compactor according to claim 8, further comprising: a transfer pump and a radiator, the engine driving the transfer pump to rotate, an oil inlet of the hydraulic torque converter is connected to an oil outlet of the transfer pump through an oil inlet passage, and an oil outlet of the hydraulic torque converter is connected to an oil inlet of the radiator through an oil return passage, and the oil outlet of the radiator is connected to the oil inlet of the transfer pump; a forced cooling system is formed between the transfer pump and the radiator and the hydraulic torque converter.

10. The hydraulic torque converter transmission system for dynamic compactor according to claim 1, further comprising a reduction gearbox assembly mounted in the reduction gearbox, and the reduction gearbox assembly comprises a reduction gearbox input gear, a reduction gearbox output gear, and a reduction gearbox intermediate gear; the reduction gearbox output gear and the reduction gearbox intermediate gear are coaxially connected, and a power of the gearbox is transmitted to the reduction gearbox input gear;

the reduction gearbox input gear is constantly meshed with the reduction gearbox intermediate gear; the reduction gearbox output gear is constantly meshed with a winched drive gear.

11. The dynamic compactor according to claim 9, further comprising: a first transmission shaft and a second transmission shaft; the first transmission shaft is arranged in the X-axis direction, the hydraulic torque converter is connected to the gearbox through the first transmission shaft; the second transmission shaft is arranged in the Y-axis direction, and the transmission case passing through the second transmission shaft is connected to the reduction gearbox.

12. The dynamic compactor according to claim 11, wherein the transfer case comprises: an input shaft of the transfer case, an intermediate shaft of the transfer case, an output shaft of the transfer case; a main gear of the transfer case is mounted on the input shaft of the transfer case; an intermediate gear of the transfer case is mounted on the intermediate shaft of the transfer case, and a driven gear of the transfer case is mounted on the output shaft of the transfer case; wherein the transfer case main gear meshes with the intermediate gear, and the intermediate gear meshes with the driven gear; the hydraulic pump is connected to the output shaft of the transfer case; the input shaft of the transfer case is connected to the engine and the hydraulic torque converter respectively.

13. The dynamic compactor according to claim 12, wherein, the gearbox comprises: a gearbox input gear and a gearbox output gear, a left deceleration intermediate gear set, a right deceleration intermediate gear set, and a gearbox clutch; the left deceleration intermediate gear set and the right deceleration intermediate gear set include upper and lower layers of coaxially connected two intermediate gears, wherein, the two intermediate gears in the upper and lower layers have different number of teeth; the output torque of the hydraulic torque converter is transmitted to a shaft of the gearbox input gear shaft, a shaft of the gearbox output gear and the transmission case; the gearbox clutch is located between the gearbox input gear and the gearbox output gear to separate or engage the shaft of gearbox input gear and the shaft of the gearbox output gear; the gearbox input gear is constantly meshed with the upper intermediate gear of the left deceleration intermediate gear set and the right deceleration intermediate gear set, the gearbox output gear is constantly meshed with the lower intermediate gear of the left deceleration intermediate gear set and the right deceleration intermediate gear set.

14. The dynamic compactor according to claim 13, wherein the transmission case comprises two X-axis bevel gears arranged symmetrically along the X-axis direction, and two Y-axis bevel gears symmetrically arranged along the Y-axis direction, each of the X-axis bevel gears constantly meshing with the two Y-axis bevel gears, each Y-axis bevel gear is constantly meshed with the two X-axis bevel gears respectively.

15. The dynamic compactor according to claim 14, further comprising a reduction gearbox assembly mounted in the reduction gearbox, and the reduction gearbox assembly comprises a reduction gearbox input gear, a reduction gearbox output gear, and a reduction gearbox intermediate gear; the reduction gearbox output gear and the reduction gearbox intermediate gear are coaxially connected, and a power of the gearbox is transmitted to the reduction gearbox input gear; the reduction gearbox input gear is constantly meshed with the reduction gearbox intermediate gear; the reduction gearbox output gear is constantly meshed with a winched drive gear.

16. The dynamic compactor according to claim 15, wherein the winch comprises a reel, a rotating shaft, a driving gear, a clutch hydraulic cylinder, a brake hydraulic cylinder, a clutch mechanism, and a brake mechanism; the reel is rotatably mounted on the rotating shaft, the drive gear is connected to the rotating shaft, the clutch hydraulic cylinder is mounted on the driving gear, the driving gear is connected to the clutch mechanism, and the clutch hydraulic cylinder drives the clutch mechanism, the drive gear is engaged and disengaged from the reel; the brake hydraulic cylinder drives the brake mechanism to brake the reel.

* * * * *